INVENTOR.
HAL B. H. COOPER
BY
T. REID ANDERSON
ATTORNEY

United States Patent Office 3,506,249
Patented Apr. 14, 1970

3,506,249
STRUCTURE AND METHOD FOR HEATING
CORROSIVE FLUIDS
Hal B. H. Cooper, Pasadena, Calif., assignor to The New
Jersey Zinc Company, New York, N.Y., a corporation
of Delaware
Continuation of application Ser. No. 584,488, Oct. 5,
1966. This application Mar. 3, 1969, Ser. No. 822,092
Int. Cl. F23l 15/04
U.S. Cl. 263—20                                    2 Claims

ABSTRACT OF THE DISCLOSURE

In the art of heating a moving stream of a corrosive fluid, it has been found that improved radiation heating effectiveness can be obtained by confining the flow of the fluid steam exposed to such radiation in a fused quartz tube which is substantially transparent to the radiation and by positioning within this tube, in physical contact with the fluid therewithin, an inner axially-extending member formed of a radiation-absorbing material which is also resistant to corrosion by the fluid being heated.

This is a continuation of application Ser. No. 584,488, filed Oct. 5, 1966 and now abandoned.

This invention relates to an improvement in method and furnace structure for the heating of corrosive materials.

Furnace structures employing metal heat transfer ducts are generally not suitable for the heating of corrosive materials, such as volatile, highly corrosive inorganic chlorides to temperatures significantly above 500° C. Fused silica, or fused quartz, as it is more commonly known, has very desirable corrosion resistant qualities and is widely used for the heating of corrosive materials to elevated temperatures where metal conduits cannot be employed. When silicon dioxide is fused at high temperatures, it can be converted from its original crystalline structure into an amorphous or non-crystalline glass, readily permitting its shaping into tubes. Fused quartz is available in either a clear or translucent (sometimes described as opaque) form.

Clear fused quartz is made from a high purity silicon dioxide, for example, naturally occurring quartz crystals. The translucent fused quartz is prepared from a specially treated silica sand. Both varieties are commercially available. Both varieties have a high silicon dioxide purity of in excess of 99.9%. One clear variety, widely marketed, has a silicon dioxide purity of about 99.97 to 99.98. The translucent variety of fused quartz, made from sand, typically has a purity of about 99.9 to 99.93% silicon oxide. Impurities are present in larger amount in the translucent variety and are typically alumina, titania, iron oxide, and in lesser amount, CaO, and $Na_2O$, $K_2O$, MgO and $Li_2O$. The clear variety of fused quartz is decidedly stronger than the translucent quartz, being of the order of 5 times or so stronger.

Many corrosive materials have a poor radiation absorptivity, this being especially so for volatile inorganic chlorides having a symmetrical molecule such as silicon tetrachloride, boron trichloride and titanium tetrachloride. Because of the low radiation absorptivity of these corrosive materials, heat is necessarily transferred to the gas stream mainly by convection from a heated solid surface rather than by radiation directly to the material. Clear fused quartz is also a poor radiation absorbing material in the elevated temperature range and, in fact, is a good radiant energy transmitter. For this reason, it has been heretofore considered necessary where heating such corrosive materials, especially those of a low radiation absorptivity, to employ a translucent fused quartz conduit in order to minimize the amount of heat transfer surface. The translucent variety of fused quartz absorbs radiant energy but, on the other hand, because of its lower strength the walls of the conduit are necessarily thicker, this being particularly true where the gas being heated is under pressure. Also, the temperature of the quartz is higher since the heat transferred to the gas being heated is transmitted by conduction through the quartz wall. Both transparent and translucent quartz have a relatively low thermal conductivity.

Fused quartz devitrifies at an accelerated rate with the increase of temperature. For example at 1450° C. devitrification can occur in a relatively short time. Above 1000° C. devitrification becomes an important consideration in the use of fused silica as the material of construction for the transfer. Thus, it will be appreciated that where the gas stream is being heated to about 1000° C. and the translucent fused quartz is necessarily at an elevated temperature, devitrification commonly occurs and the strength of the tube rapidly deteriorates and failures frequently occur.

It would thus be understood why, with the well-known fragility of fused quartz, many problems of design and maintenance must occur, which lead to very high investment and maintenance costs particularly when compared with heating systems where a metal heat transfer surface may be used.

It is a principal object of this invention to provide an improved method and furnace structure for heating corrosive materials, especially corrosive materials having poor radiation absorptivity.

It is a still further object of the invention to provide an improved method for heating more material per unit length of heating conduit.

It is a further object of the invention to provide an improved furnace structure having a lower initial capital investment and lower costs of maintenance.

It is a further object of the invention to provide a more compact furnace structure having shorter lengths of heating conduit.

It is a still further object of the invention to provide an improved fused quartz conduit structure less subject to devitrification.

It is an additional object of the invention to provide a fused quartz conduit structure permitting more ready heating of gases at elevated pressures.

It is another object of the invention to provide a fused quartz structure wherein substantially all of the radiant heat falling on the outside surface of the structure is transferred internally to the fluid without intermediate conduction of the heat through the outer containing walls of the conduit.

The method of the invention is especially suited for the heating of a gas stream containing molecules having poor radiation absorptivity. The method includes passing the gas stream through a tubular heating zone having an outer substantially radiation transparent fused quartz wall. The zone is provided with an axially-extending radiation-absorbing core member preferably of radiation translucent fused quartz. The tubular heating zone is exposed to a radiant energy source. The radiant energy passes through the outer transparent surface with little absorption, through the low radiation-absorbing fluid being heated, and strikes the inner core member where it is absorbed and transformed into heat. Heat is thereupon transferred from the core member to the gas stream by convection. Preferably, the core member is tubular and the gas stream is divided between the annular section defined by the outer radiation transparent wall and the outside of the tubular core member and an inner heating zone enclosed by the tubular core. With the tubular inner core structure, heat is transferred to the fluid flowing on the annulus side by convection and to that on the inside of the tube by conduction through the tubular core and then by convection to the fluid. In addition, some heat is also transferred through the outer radiation transparent fused silica wall by conduction from the external radiant energy source, ordinarily hot combustion gases, to the fluid being heated in the annulus and to the fluid by convection.

The improved furnace structure of the invention includes an outer, substantially radiation-transparent fused quartz tube having an inner, axially-extending radiation-absorbing member formed of a material which is corrosion resistant to the fluid being heated. In a preferred embodiment of the improved structure, the inner axially-extending member is a thin walled tube. The inner member is formed of a corrosion resistant material capable of withstanding the temperature of operation, typically operating temperatures up to about 1000° C. Suitable materials of construction include radiation absorbing silica, alumina, carbon, Carborundum (silicon carbide), refractory metal carbides and oxides, and alumina-silicates. Translucent fused quartz is a suitable material of construction for the thin-walled inner tube.

The thin-walled inner tube is normally concentrically positioned and sized to divide the fluid stream, substantially equally between the annulus, defined by the two tube members, and the interior of the inner tube.

The major increase in heat transfer area of the structure of the invention over presently used structures employing translucent single tubes may be translated to more fluid being heated per length of heating conduit and, therefore, to a shorter length of heating structure. The improved structure of the invention permits the erection of smaller and lower cost furnaces and leads to significantly reduced maintenance costs. The temperature level of the outer radiation-transparent quartz tube is significantly lower than the temperatures to which the single tube, translucent quartz structures have had to be heated to obtain the same fluid temperature, of the past. This lower temperature increases the life and strength of the structure since devitrification of the outer tube and lessening of strength is minimized. The latter advantage is particularly important where the fluid being heated is under pressure, since at best the structural strength of fused quartz tubes is not outsanding. Higher fluid operating pressures can thus be employed, for instance, in the heating of titanium tetrachloride.

The inner radiant energy absorbing translucent tube need not have a heavy wall since the pressure is the same on both sides. With such thin wall construction, the resistance to heat transfer to the inside surface of the inner tube is thereby reduced in a major way as compared to that which would be required if the radiant energy absorbing material also had to withstand pressure. It will be seen that the heat transfer takes place from both sides of the inner radiation absorbing tube and that the radiant heat falling on the outside surface of such a tube composed of translucent fused quartz is transferred directly to the fluid being heated (a) by convection from the absorbed heat of the tube and (b) by that amount of the radiation which passes through the translucent tube into the fluid flowing therethrough.

The method and structure of the invention are particularly suitable for the heating of various volatile inorganic halides to elevated temperatures. Typically, the halides heated in the conduit structure of the invention are relatively low boiling having boiling points up to around 500° C., usually less than 400° C. It is particularly advantageous to heat symmetrical molecules such as boron trichloride, silicon tetrachloride, and titanium tetrachloride in the process of the invention. The process may also be employed for the heating of the various halogens in elemental form, for example, bromine, chlorine, fluorine, and iodine, or their acids, such as hydrogen bromide, hydrogen chloride, and hydrogen iodide. The process is especially suitable for the heating of various metallic halides, in particular the fluorides, chlorides, bromides and iodides of aluminum, boron, iron, titanium, silicon, vanadium, tungsten and zirconium. The structure and process may also be utilized for the heating of such noncorrosive gases as nitrogen, hydrogen and neon. Other prospective inorganic halide fluid streams that are heated to advantage include the fluorides, chlorides, bromides and iodides of beryllium, bismuth, gallium, germanium, indium, mercury, molybdenum, and uranium. Other low boiling halides are those of niobinium, osminium, rhenium, and the halides of phosphorus including the bromide, chloride, and iodide.

Other objects and advantages of the structure and method of the invention will become more apparent from the following description and drawings wherein.

Figure 1:
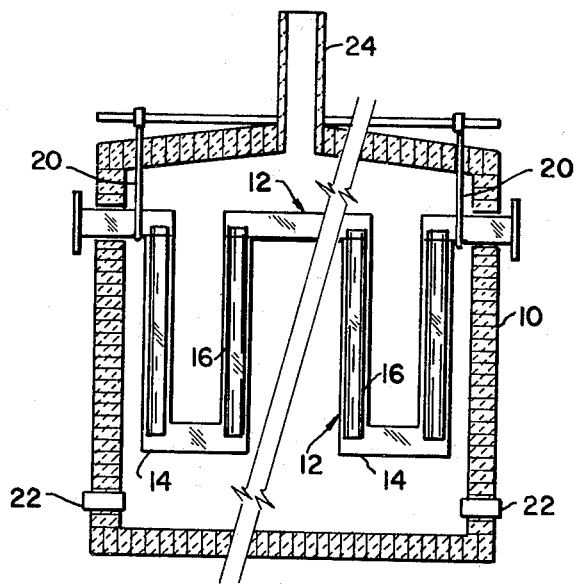
FIG. 1 is a fragmentary sectional view of a furnace incorporating the fused quartz tube structure of the invention.
Figure 3:
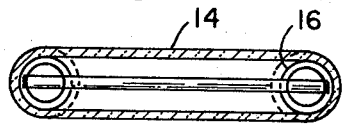
FIG. 3 is a plan, sectional view taken along line 3—3 of FIG. 2.
Figure 4:
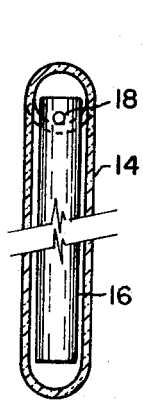
FIG. 4 is a vertical section view taken along line 4—4 of FIG. 2.
Figure 2:
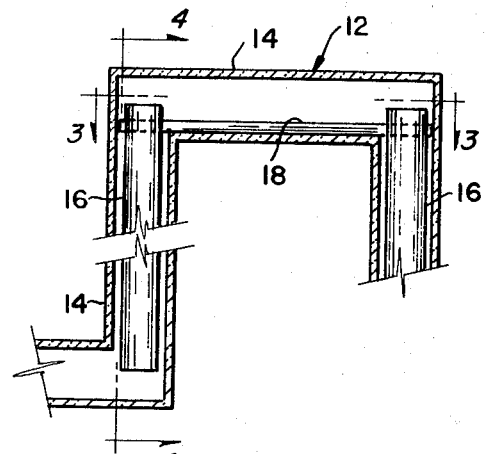
FIG. 2 is an enlarged, vertical cross-sectional view of the quartz tube conduit structure of FIG. 1.
Figure 6:
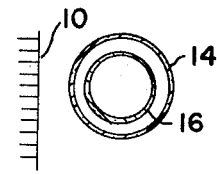
FIG. 6 is a plan view of FIG. 5.
Figure 5:
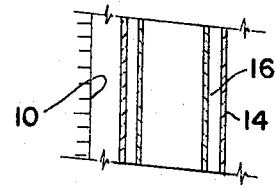
FIG. 5 is a schematic, sectional view of the quartz tube structure of the invention.

There is illustrated in FIG. 1 a furnace 10 which may be conventional in structure, except for the quartz tube conduit 12. The conduit 12 has a general serpentine shape comprising alternately horizontal and vertical sections. The conduit 12 has an outer, infrared transparent fused quartz tube 14 and in the particular design illustrated there is provided in each of the vertical sections an inner, concentric infrared absorbing tube 16, preferably formed of radiation-absorbing fused quartz. The several inner tubes 16 are supported in their respective sections of the conduit 12 by horizontally disposed support rods 18 formed of alumina or other suitable corrosion-resistant, refractory material. The support rod 18, illustrated in FIG. 2, rests on the inside bottom surface of a horizontal segment of the outer tube 14 and supports at its respective ends the inner radiation-absorbing tube 16. The conduit 12 is supported by hangers 20 which may be watercooled U-shape steel pipes or other suitable arrangement. The conduit 12 in the embodiment illustrated rests on the inside surface of the closed end of the U-hanger 20. The particular furnace illustrated in FIG. 1 is provided with conventional gas burners 22 whose exhaust gases empty into the interior of the furnace and therein provide radiant energy for the heating of the gas stream passing through the conduit 12. The combustion gases leave the furnace through a stack 24. Alternatively, the furnace may be heated by electrical heaters located along the side walls of the furnace adjacent to the quartz tube conduit 12.

In the instance of low velocity gas flow, the weight of the freely supported inner tubes 16 will generally be adequate to avoid the possibility of swinging within the outer tubes 18, but in some applications with increased gas flow, it will become desirable to use spacers between the two tubes to minimize movement of the inner tube. In the embodiment illustrated, the inner tubes 16 are positioned only within the vertical segments of the outer tubes 14; however, it will be appreciated that the inner tubes 16 could also be located within the horizontal segments of the outer tubes 14. For reason of clarity, only two conduit U-hangers 20 are shown in FIG. 1; although it will be understood that the hangers will be employed in the number required to support adequately the conduit 12.

The transfer of heat at high temperature levels, for example, 800° C., is much more effective and efficient by radiation, which is characteristic of the foregoing tube structure, than by conduction and convection, which is the controlling method of the single, translucent tube structure of the prior art. Transfer by radiation is expressed by the familiar Stefan-Boltzman equation, which involves fourth power differences of the temperatures. Thus,

EQUATION 1

$$Q = AK(T_1^4 - T_2^4)$$

The transfer by convection, on the other hand, takes place only by the first power difference of the temperatures. It is expressed by the following equation:

EQUATION 2

$$Q = AC(T_1 - T_2)$$

Q=Heat transferred in the thermal units/hour
$T_1$=High level temperature
$T_2$=Low level temperature
A=Area of heat transfer surface
K and C=Appropriate constants The concentric tube concept of the invention yields much higher rates of heat transfer than the presently used single tube design. In most cases, the tube length can be shortened by a factor of one-third to one-half and the furnace size decreased accordingly, or alternatively increased capacities obtained for the same furnace size. Thus, it is seen that with the concentric tube structure of the invention, fused quartz becomes a much more satisfactory, useful and economic material of construction. Among the important advantages of the concentric tube over the single tube design are greater strength, ability to employ higher fluid pressures, and lower temperature of operation of the outer fluid containing tube, thereby giving longer life through less tendency to devitrify.

Having thus described this invention fully and completely as required by the patent laws, it will be apparent to those skilled in the art that other variations are possible. It should, therefore, be understood that within the scope of the appended claims this invention may be practiced otherwise than as specifically described.

I claim:

1. In a furnace structure of the type employing a fused quartz tube for the transference of a corrosive fluid stream to be heated, the improvement which comprises using two concentric fused quartz tubes within the furnace both of at least 99.9% purity (expressed as $SiO_2$), the outer tube being radiation transparent and the inner tube being radiation translucent, the tubes being arranged so that the fluid stream to be heated flows freely through both the inner tube and the annulus between the inner and outer tubes in substantially equal streams.

2. In the method of heating a flow of corrosive gas while enclosed in a fused quartz tube in a heating zone, the improvement which comprises dividing the flow of gas by passing it through a pair of concentrically positioned fused quartz tubes of at least 99.9% purity (expressed as $SiO_2$), using a radiation transparent fused quartz as the outer tube, using a radiation translucent fused quartz as the inner tube, and exposing the tubes to a source of radiant energy so that the radiation passes freely through the outer tube and only partially through the inner tube and thus transfers heat from the source to the gas stream by the radiation passing through both tubes and by contact with the inner and outer surfaces of the inner tube heated by its partial absorption of the radiation.

References Cited

UNITED STATES PATENTS

| 2,652,037 | 9/1953 | Lewis et al. | 122—510 |
| 3,020,032 | 2/1962 | Casey | 263—42 |

EDWARD G. FAVORS, Primary Examiner

U.S. Cl. X.R.

263—52